United States Patent
Hamlin et al.

(10) Patent No.: US 9,230,082 B2
(45) Date of Patent: Jan. 5, 2016

(54) APPARATUS AND METHOD FOR ENABLING FINGERPRINT-BASED SECURE ACCESS TO A USER-AUTHENTICATED OPERATIONAL STATE OF AN INFORMATION HANDLING SYSTEM

(71) Applicant: Dell Products L.P., Round Rock, TX (US)

(72) Inventors: Daniel L. Hamlin, Round Rock, TX (US); James T. Gillon, Round Rock, TX (US); Christian L. Critz, Georgetown, TX (US)

(73) Assignee: Dell Products, L.P., Round Rock, TX (US)

(*) Notice: Subject to any disclaimer, the term of this patent is extended or adjusted under 35 U.S.C. 154(b) by 184 days.

(21) Appl. No.: 13/893,657

(22) Filed: May 14, 2013

(65) Prior Publication Data
US 2014/0344921 A1 Nov. 20, 2014

(51) Int. Cl.
G06F 21/00 (2013.01)
G06F 21/32 (2013.01)
G06F 21/62 (2013.01)
H04L 29/06 (2006.01)

(52) U.S. Cl.
CPC .............. G06F 21/32 (2013.01); G06F 21/629 (2013.01); *H04L 63/0861* (2013.01)

(58) Field of Classification Search
CPC ....... G06F 1/32; G06F 21/629; G06F 1/3203; G06F 1/3206; G06F 1/3231; G06F 1/3234; G06F 1/3287; G06F 21/31; G06F 21/32; H04L 63/0861; H04L 91/3231
See application file for complete search history.

(56) References Cited

U.S. PATENT DOCUMENTS

| | | | |
|---|---|---|---|
| 2002/0095608 A1* | 7/2002 | Slevin | 713/202 |
| 2003/0005337 A1* | 1/2003 | Poo et al. | 713/202 |
| 2004/0155752 A1* | 8/2004 | Radke | 340/5.53 |
| 2009/0164797 A1* | 6/2009 | Kramer | 713/186 |
| 2013/0263252 A1* | 10/2013 | Lien et al. | 726/19 |

* cited by examiner

Primary Examiner — Yogesh Paliwal
(74) Attorney, Agent, or Firm — Isidore PLLC (57) ABSTRACT

A computer-implemented method provides power to a fingerprint reader while the remaining components of the information handling system are held in a low power, non-operating state. Placement of a finger across the fingerprint reader is detected with the information handling system in the non-operating state. A fingerprint is read and a corresponding fingerprint image is generated. The fingerprint image is buffered and an embedded controller is triggered to start an authentication device having a secure storage. The fingerprint image is compared to a fingerprint template contained in the secure storage. In response to the fingerprint image matching the fingerprint template, the authentication device signals the embedded controller to activate a user authenticated wake-up cycle to provide power to the other components of the information handling system such that the information handling system activates an operating system and enters a fully powered and user authenticated, operational state.

19 Claims, 8 Drawing Sheets

APPARATUS AND METHOD FOR ENABLING FINGERPRINT-BASED SECURE ACCESS TO A USER-AUTHENTICATED OPERATIONAL STATE OF AN INFORMATION HANDLING SYSTEM

BACKGROUND

1. Technical Field

The present disclosure generally relates to providing secure access to an information handling system and in particular to enabling fingerprint-based access to a user-authenticated operational state of an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing secure access to an information handling system is important to prevent unauthorized access to applications and/or data available on the information handling system. Various methods are known to provide secure access to information handling systems. For example, various levels of passwords can be used to limit access to an information handling system. Biometric data can also be used to restrict access to the information handling system by only authorized users. One problem with the use of passwords and biometric data is that at least a portion of the passwords and biometric data is stored on unsecure system memory that is vulnerable to theft or modification by malware, viruses and other malicious programs.

Another problem with the use of passwords and biometric data is that at least an entire authentication system is required to be powered and continues to consume power even when the information handling system is in a powered down or sleep state. Unfortunately, for portable information handling systems that are battery powered, when the information handling system is in a sleep state, to allow for quick resumption of the system, the authentication system continues to consume and deplete battery power. Over a period of time, the battery can be completely discharged resulting in a non-operational information handling system.

BRIEF SUMMARY

Disclosed is a method and information handling system to enable fingerprint-based wake-up the information handling system and secure access to a user-authenticated operational state of the information handling system.

According to one embodiment, the method comprises providing power to a fingerprint reader while remaining components of the information handling system are held in a low power, non-operating state in which the information handling system is not functional. In response to detecting placement of a finger across a surface of the fingerprint reader while the information handling system is in the low power, non-operating state, a fingerprint is read from a finger and a corresponding fingerprint image is generated. The fingerprint image is buffered and an embedded controller is triggered to start operation of an authentication device having secure storage. The fingerprint image is compared to a previously-established fingerprint template contained in the secure storage. In response to the fingerprint image matching the fingerprint template, the authentication device signals the embedded controller to activate a user authenticated wake-up cycle to provide power to processing and other components of the information handling system such that the information handling system activates an operating system and enters a fully powered-on and user authenticated, operational state.

Also disclosed is an information handling system (IHS) that comprises a processor, a memory coupled to the processor via a system interconnect and an authentication sub-system communicatively coupled to the system interconnect. The authentication sub-system includes a fingerprint reader, an embedded controller, and secure storage. The authentication sub-system has firmware executing thereon to enable fingerprint-based secure access to a user-authenticated operational state of the information handling system. The firmware configures the authentication sub-system to provide power to the fingerprint reader while remaining components of the information handling system are held in a low power, non-operating state in which the information handling system is not functional. In response to detecting placement of a finger across a surface of the fingerprint reader while the information handling system is in the low power, non-operating state, a fingerprint is read from the finger and a corresponding fingerprint image is generated. The fingerprint image is buffered. An embedded controller is triggered to start operation of an authentication device having secure storage. The fingerprint image is compared to a previously-established fingerprint template contained in the secure storage. In response to the fingerprint image matching the fingerprint template, the authentication device signals the embedded controller to activate a user authenticated wake-up cycle to provide power to processing and other components of the information handling system such that the information handling system activates an operating system and enters a fully powered-on and user authenticated, operational state.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6 (6A-6C) is a flow chart illustrating one example of the method by which fingerprint-based secure access to a user-authenticated operational state of the information handling system occurs, according to one or more embodiments.

DETAILED DESCRIPTION

The illustrative embodiments provide an information handling system (IHS) and a method performed within the information handling system for enabling fingerprint-based wake-up to a user-authenticated operational state of the information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
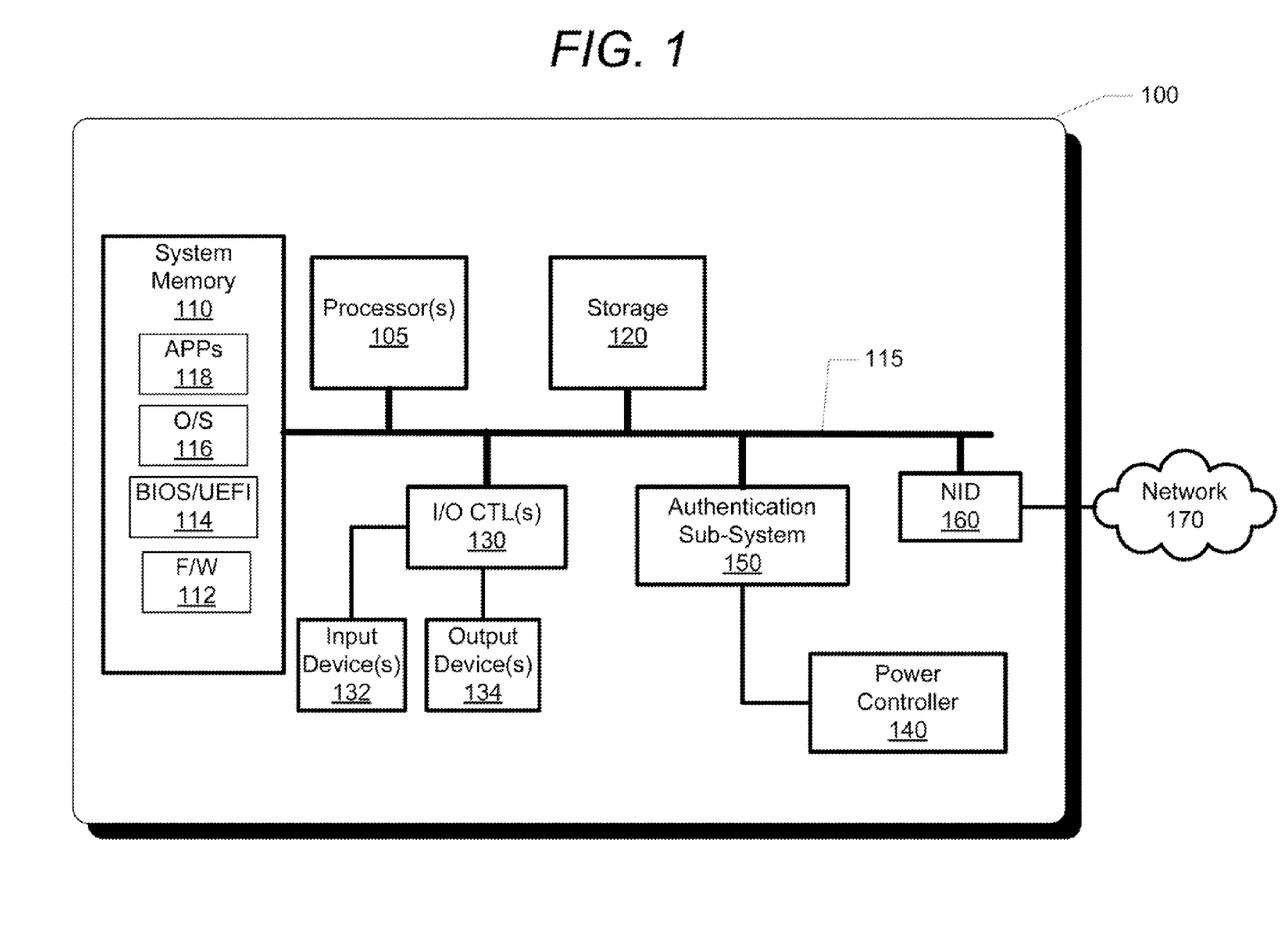
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and can be more completely referred to as BIOS/UEFI 114 in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes an authentication sub-system 150, which is in communication with processor(s) 105 and system memory 110 via system interconnect 115. Authentication sub-system 150 contains components that enable fingerprint-based secure access to a user-authenticated operational state of IHS 100. Authentication sub-system 150 is in communication with power controller 140. Power controller 140 provides regulated voltages and current levels to each of the components of IHS 100 through various electrical connections (not shown). Authentication sub-system 150 can at least partially control the operation of power controller 140. In one embodiment, authentication sub-system 150 can cause power to be supplied to some components of IHS 100 and cause power to be turned off to other components of IHS 100.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
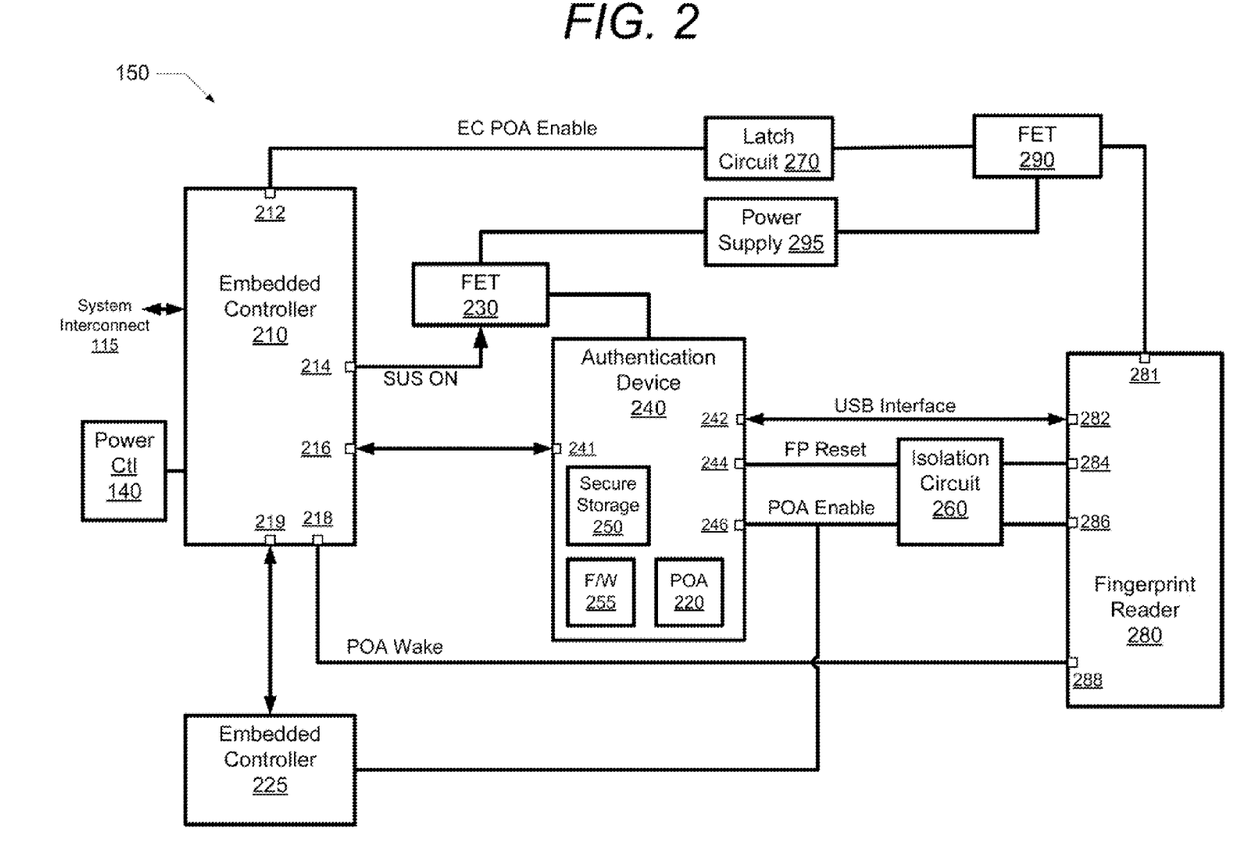
FIG. 2 illustrates a component level view of an authentication sub-system having a fingerprint reader and other functional components that support fingerprint-based secure access to a user-authenticated operational state of the information handling system, in accordance with one embodiment.

With reference now to FIG. 2, there is illustrated one embodiment of a component level view of authentication sub-system 150 that supports fingerprint-based secure access to a user-authenticated operational state of IHS 100. Authentication sub-system 150 comprises embedded controllers 210 and 225, authentication device 240, isolation circuit 260 and fingerprint reader 280. Embedded controller 210 is coupled to system interconnect 115 in order to communicate with other components of IHS 100. Embedded controller 210 is also communicatively coupled to power controller 140 and another embedded controller 225. Embedded controller 210 has terminals 212, 214, 216, 218 and 219. Terminal 212 is coupled to a latch circuit 270 which in turn is coupled to a field effect transistor (FET) 290. FET 290 is coupled to terminal 281 of fingerprint reader 280. Power supply 295 is coupled to FET 290 and provides a power source to FET 290. Embedded controller 210 controls the operation of FET 290, via terminal 212 such that FET 290 can turn fingerprint reader 280 on or off. Embedded controller 210 can generate an embedded controller power on authentication (EC POA) enable signal that causes latch circuit 270 to turn FET 290 on. BIOS/UEFI 114 (FIG. 1) can selectively trigger embedded controller 210 to turn fingerprint reader 280 on or off.

Terminal 214 is coupled to FET 230, which is coupled to power supply 295. Power supply 295 provides a power source to FET 230 (e.g. 3.3 volts). FET 230 provides a controlled power source for authentication device 240. Embedded controller 210 triggers a SUS ON signal to be generated at terminal 214 that controls the operation of FET 230. Embedded controller 210 is coupled to and in communication with authentication device 240 via respective terminals 216 and 241. Terminal 218 is coupled to terminal 288 of fingerprint reader 280. Terminal 219 is coupled to embedded controller 225.

Authentication device 240 includes a power on authentication (POA) firmware 220, secure storage 250 and firmware 255. Authentication device 240 enables fingerprint-based recognition and matching to allow secure access to a user-authenticated operational state of IHS 100. As provided herein, secure storage 250 is a secure storage device that allows storage of sensitive material such as passwords, credentials, biometric data and other security functions. Secure storage 250 provides secure storage that is separate from system memory 110 (FIG. 1). In one embodiment, secure storage 250 is a non-volatile storage device. Firmware 255 executes within authentication device 240 to provide the functionality of fingerprint-based recognition and matching to allow secure access to a user-authenticated operational state IHS 100. In one embodiment, authentication device 240 can be a unified security hub or secure applications processor BCM5882 that is commercially available from Broadcom Corporation of Irvine, Calif.

During the startup operation, BIOS/UEFI 114 (FIG. 1) loads POA 220, which can be interchangeably referred to as POA firmware 220, such that POA 220 is operational, running under O/S 116 on IHS 100. POA 220 functions to cause IHS 100 to enter a low power, non-operating state in which the majority of the components of the information handling system such as the processor, memory and storage are not functional after a pre-determined period of non-use or other criteria. While, IHS 100 enters the low power, non-operating state, POA 220 causes fingerprint reader 280 to retain power. All of the remaining circuits of IHS 100 and authentication sub-system 150 are placed in a low power, sleep or hibernate state in which IHS 100 and authentication sub-system 150 are not functional (see FIG. 1).

Authentication device 240 has terminals 241, 242, 244 and 246. Terminal 241 is coupled to terminal 216 of embedded controller 210. Terminal 242 is a universal serial bus (USB) interface and is coupled to terminal 282 of fingerprint reader 280. Authentication device 240 can communicate with fingerprint reader 280 through the USB interface. Terminal 244 is coupled to terminal 284 of fingerprint reader 280 via an isolation circuit 260. Terminal 244 is used to transmit a fingerprint reset signal to terminal 284 in order to reset fingerprint reader 280. Terminal 284 is isolated from terminal 244 by isolation circuit 260 to prevent any back drive. Terminal 246 is coupled to embedded controller 225 and is also coupled to terminal 286 of fingerprint reader 280 via isolation circuit 260. Terminal 246 is used to transmit a power on authentication "enable" signal to terminal 286. Terminal 286 is isolated from terminal 246 by isolation circuit 260 to prevent any back drive. The power on authentication signal tells fingerprint reader 280 that authentication device 240 is powered and initialized and triggers fingerprint reader 280 to establish a USB communication link to authentication device 240 via terminals 242 and 282.

Fingerprint reader module 280 contains a fingerprint reader and remains powered while the other components of IHS 100 are in a low power, non-operating state. Fingerprint reader 280 has terminals 281, 282, 284, 286 and 288. Terminal 281 is coupled to FET 290. Terminal 282 is coupled to terminal 242 of authentication device 240. Terminals 284 and 286 are coupled to isolation circuit 260. Terminal 288 is coupled to terminal 218 of embedded controller 210. Fingerprint reader 280 transmits a POA wake signal to embedded controller 210 via terminals 288 and 218 in order to wake embedded controller 210 from the low power, non-operating state.

Figure 3:
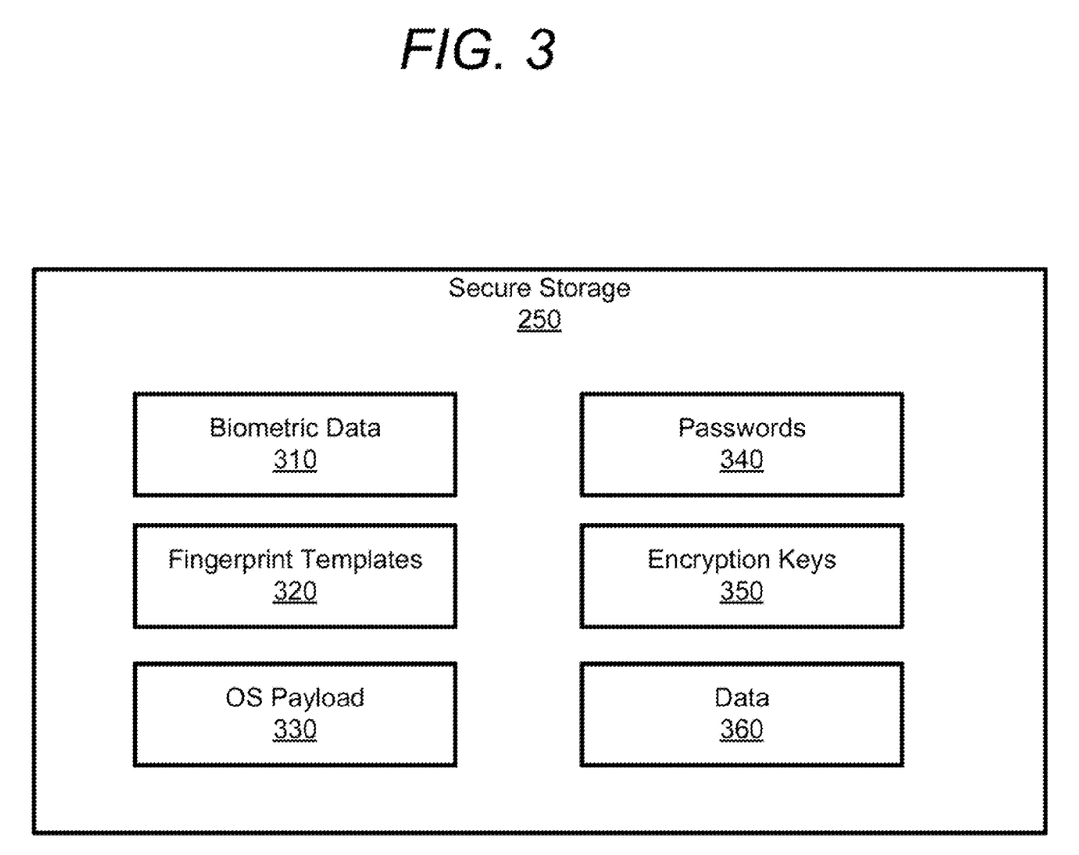
FIG. 3 is a block diagram illustrating contents of a secure storage of the authentication sub-system, in accordance with one embodiment.

FIG. 3 illustrates further details of secure storage 250. Secure storage 250 is a secure storage device that allows storage of sensitive payload information, data and material. Secure storage 250 provides secure storage that is separate from system memory 110 (FIG. 1). Secure storage 250 can store biometric data 310, fingerprint templates 320, OS payload 330, passwords 340, encryption keys 350 and data 360. Biometric data 310 includes human identification data such retina scans or fingerprint data. Fingerprint templates 320 include fingerprints of authorized enrolled users of IHS 100. OS payload 330 is used to bypass loading of POA (firmware) 220 (FIG. 2) after a successful fingerprint match has occurred. Passwords 340 include passwords to allow access to at least a portion of IHS 100. Encryption keys 350 are used to encrypt and decrypt data sent and received by IHS 100. Data 360 contains various other secure data that is used by IHS 100.

Figure 4:
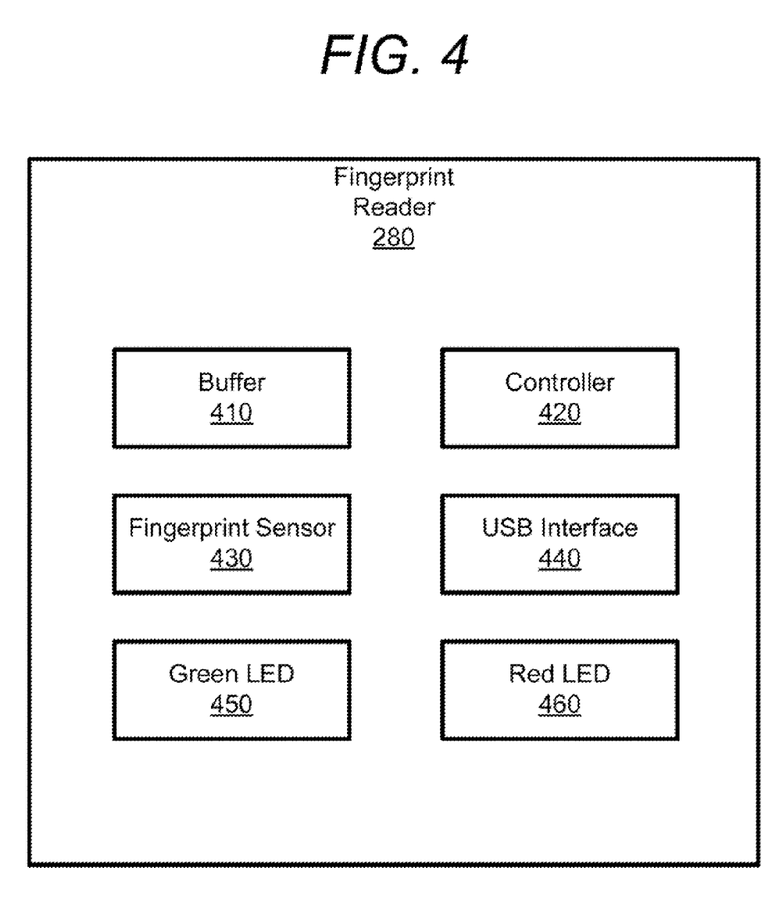
FIG. 4 is a block diagram illustrating components of the fingerprint reader, in accordance with one embodiment.

Referring to FIG. 4, the components of fingerprint reader 280 are shown. Fingerprint reader 280 can detect the presence of a finger adjacent to the fingerprint reader module, scan the finger and generate a fingerprint image. Fingerprint reader 280 comprises a buffer 410, controller 420, fingerprint sensor 430, USB interface 440, green light emitting diode (LED) 450 and red LED 460. Buffer 410 is used to store fingerprint images. Controller 420 contains logic circuits that control the operation of fingerprint reader 280. Fingerprint sensor 430 can detect the presence of a finger adjacent to the fingerprint sensor, scan the finger and generate a fingerprint image. Fingerprint sensor 430 is mounted on an exterior surface of IHS 100. USB interface 440 provides a universal serial bus communication link between authentication device 240 and authentication device 280 (FIG. 2). Green LED 450 and red LED 460 are mounted on an exterior surface of IHS 100. Green LED 450 provides a visual indication to a user that a finger scan has successfully matched a stored fingerprint template allowing access by the user to IHS 100. Red LED 460 provides a visual indication to a user that a finger scan has failed to match a stored fingerprint template and that access to IHS 100 has been denied.

In one alternative embodiment, only one LED is provided to indicated when a fingerprint match has passed or failed. The single LED can be illuminated or made to flash/blink following success or failure of the authentication.

Those of ordinary skill in the art will appreciate that the hardware components and basic configuration depicted in FIGS. 1-4 and described herein may vary. For example, the illustrative components within IHS 100 (FIG. 1) and authentication subsystem 150 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5:
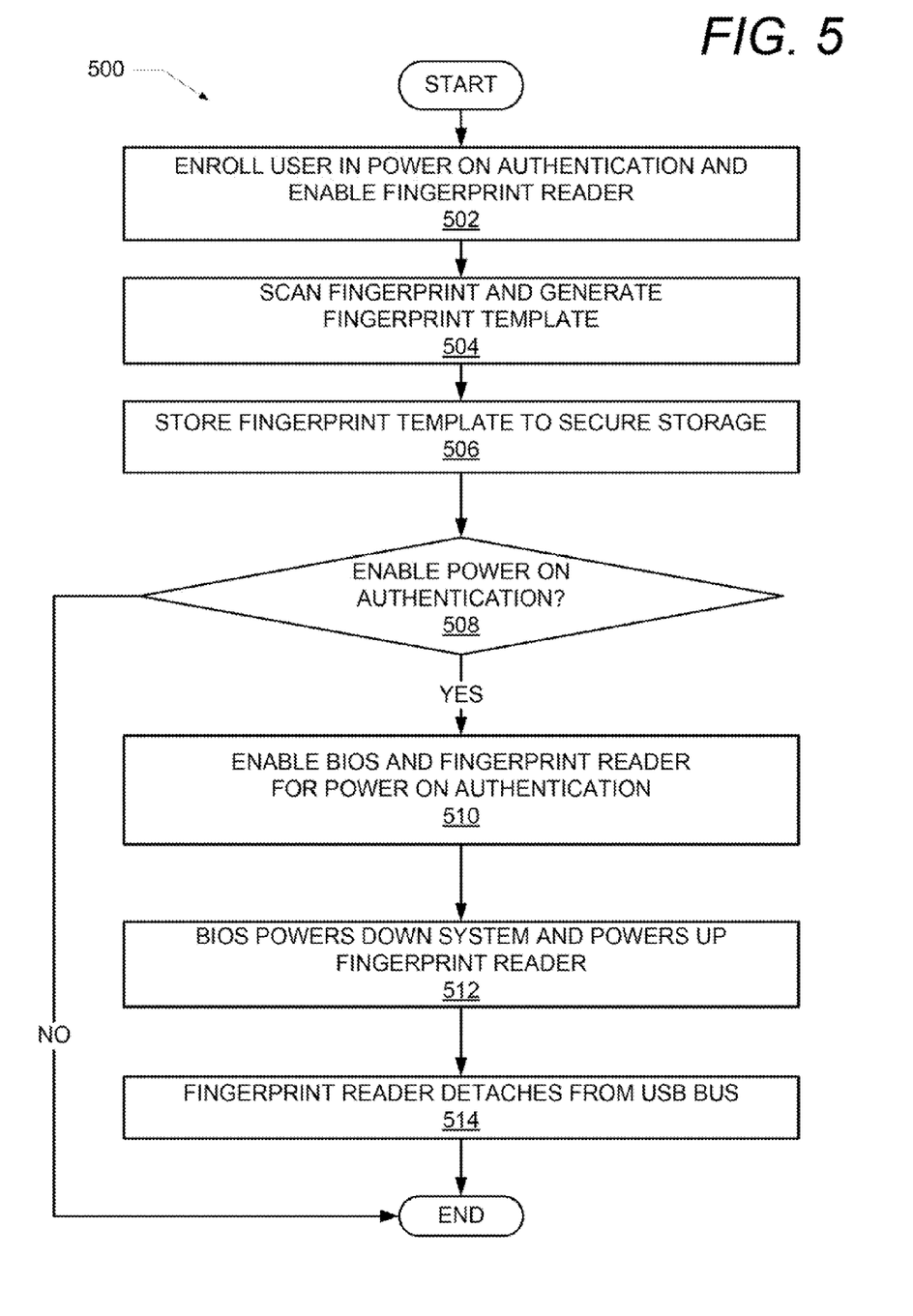
FIG. 5 is a flow chart illustrating one example of the method by which a user fingerprint is enrolled in a fingerprint power on authentication application, according to one or more embodiments.
Figure 6A:
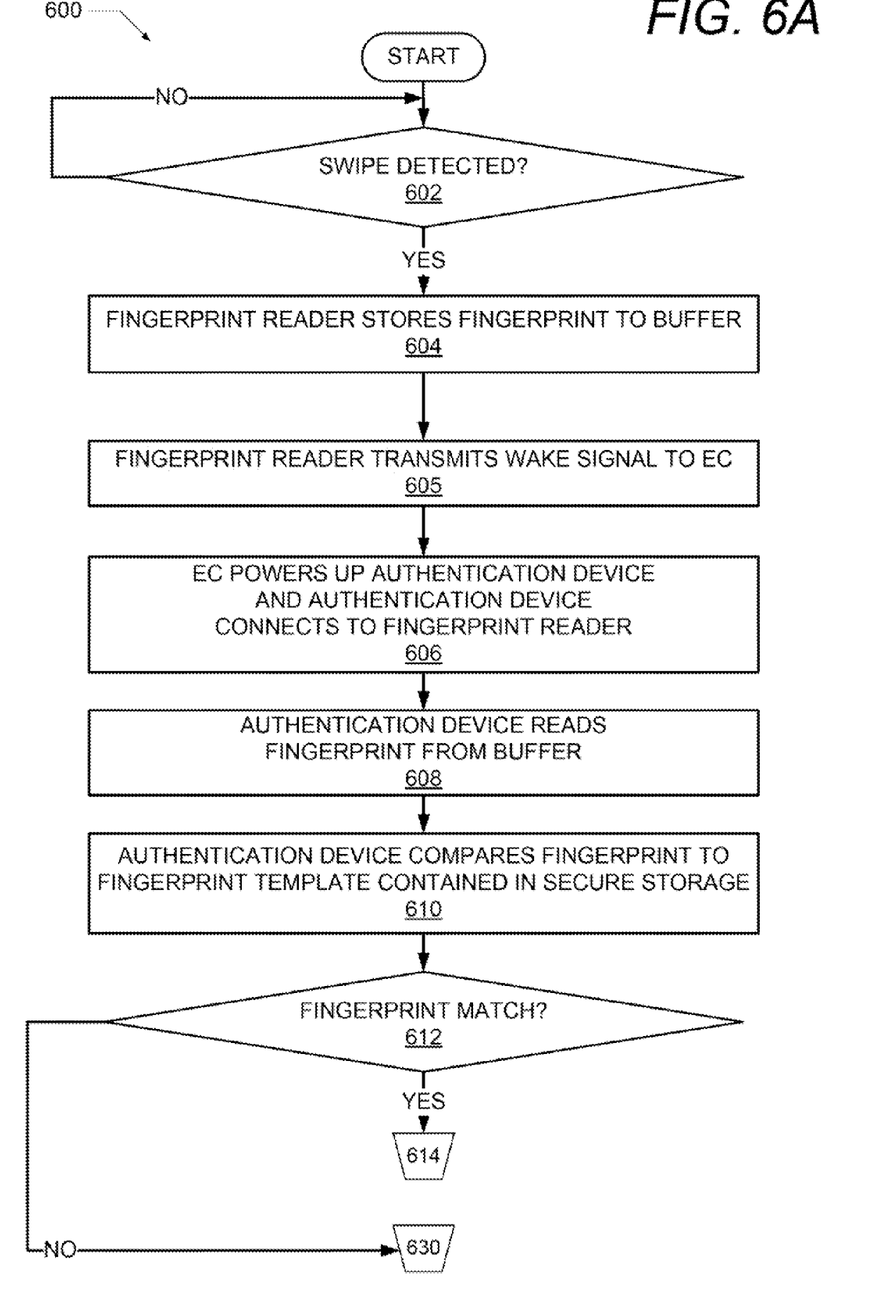
Figure 6B:
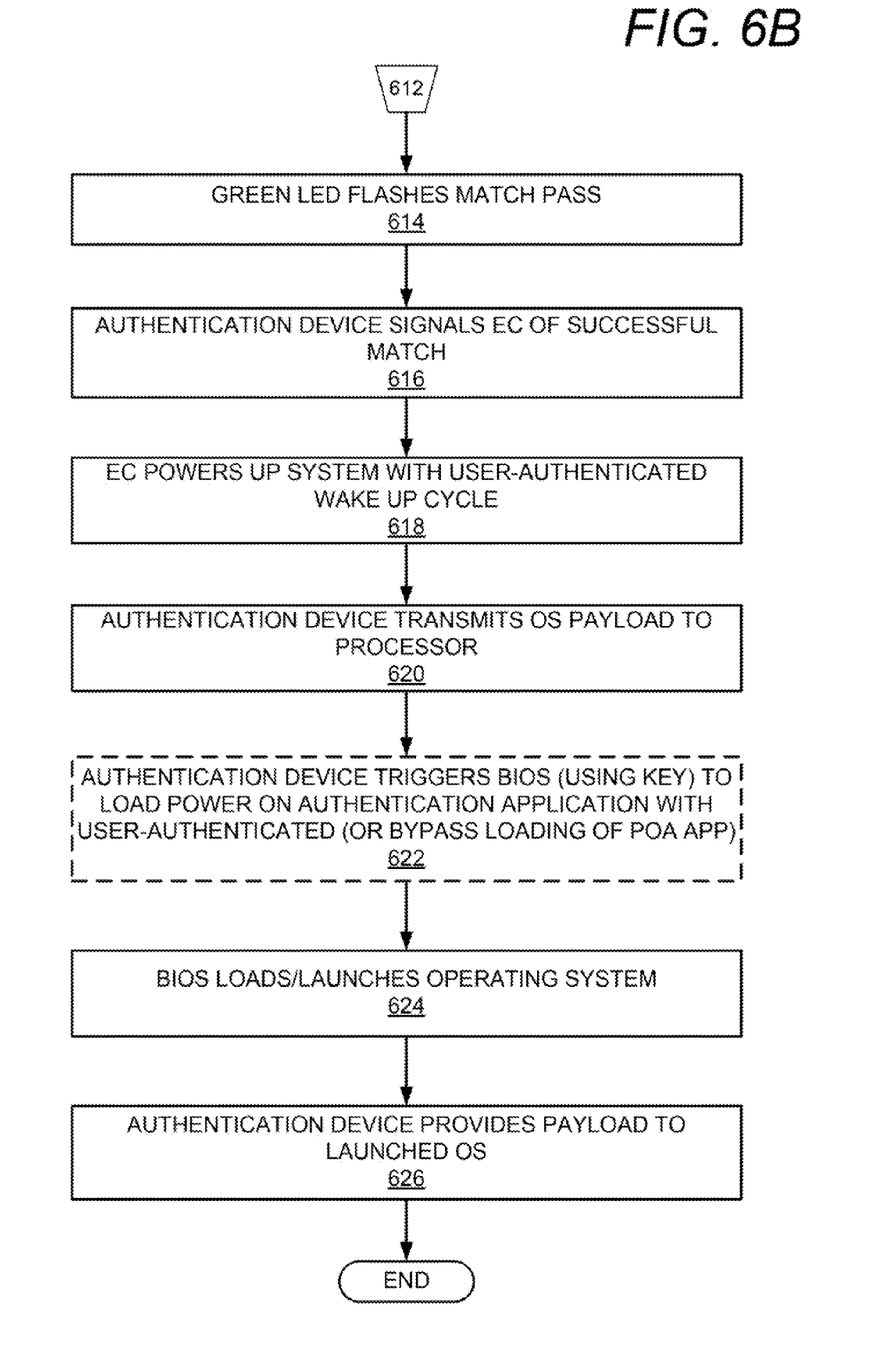
Figure 6C:
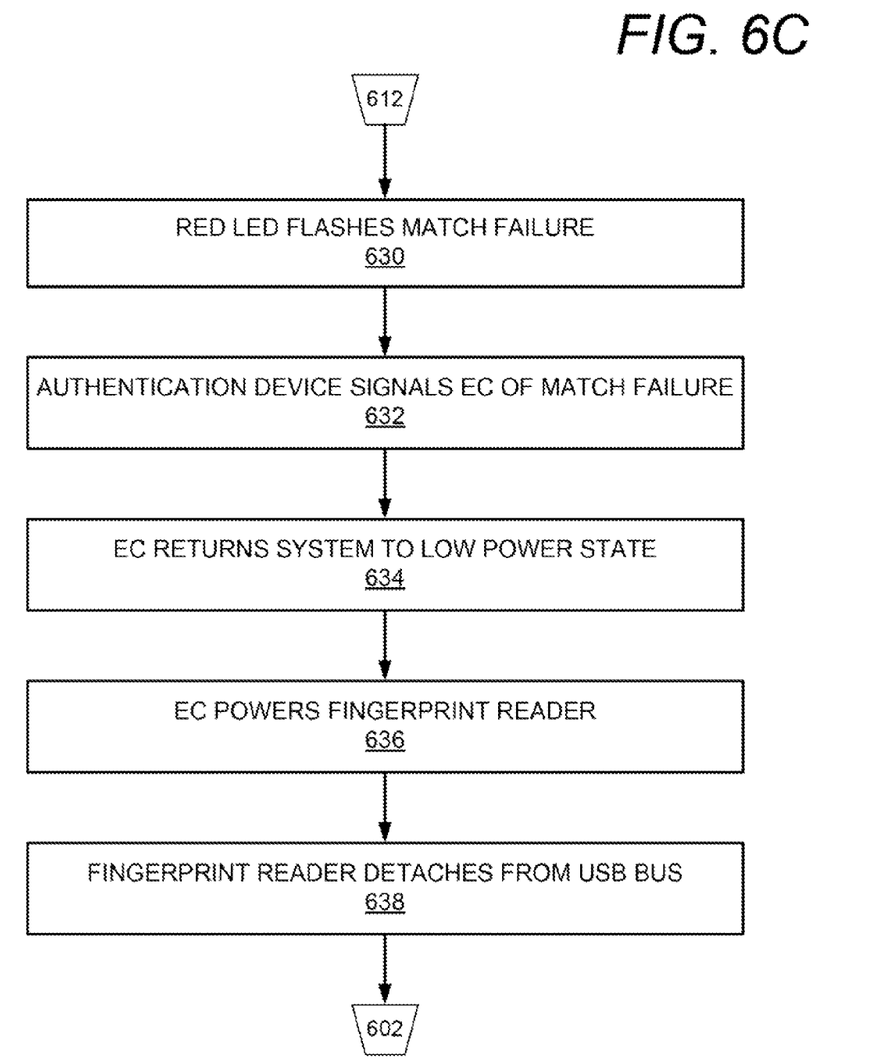

The following flowcharts of FIGS. 5 and 6(A-C) disclose specific functionality provided by authentication sub-system 150 and specifically by the execution of firmware 255 within authentication device 240 related to enabling fingerprint-based secure access to a user-authenticated operational state of information handling system 100. According to one embodiment, firmware 255 includes program code that when executed configures the authentication device 240 to provide the various functions described within the present disclosure. Specifically, the firmware 255 configures the authentication device to provide power to the fingerprint reader 280 while the remaining components of IHS 100 are held in a low power, non-operating state in which the information handling system is not functional. In response to detecting placement of a finger across a surface of the fingerprint sensor 430 while IHS 100 is in the low power, non-operating state, a fingerprint is read from the finger and a corresponding fingerprint image is generated. The fingerprint image is buffered in buffer 410. Embedded controller 210 is triggered to start operation of authentication device 240. The fingerprint image is compared to a previously-established fingerprint template contained in secure storage 250. In response to the fingerprint image matching the fingerprint template, the authentication device 240 signals the embedded controller 210 to activate a user authenticated wake-up cycle to provide power to the processing and other components of IHS 100 such that the information handling system activates an operating system and enters a fully powered-on and user authenticated, operational state.

According to one aspect of the disclosure, the process by which authentication device 240 enables creation of a fingerprint template 320 for use as an authentication mechanism includes the firmware 255 configuring authentication device 240 to prompt for placement of a finger scan across the fingerprint sensor 430 and scanning the fingerprint from the finger placed across the fingerprint sensor. A fingerprint image is generated from the finger and a fingerprint template is generated corresponding to the fingerprint image. The fingerprint template is stored to the secure storage 250.

FIG. 5 and FIGS. 6(A-C) illustrate flowcharts of exemplary methods by which authentication sub-system 150 within the preceding figures performs different aspects of the processes that enable the one or more embodiments of the disclosure. Generally, method 500 and method 600 collectively represent computer-implemented methods to enabling fingerprint-based secure access to a user-authenticated operational state of an information handling system. The description of each method is provided with general reference to the specific components illustrated within the preceding FIGS. 1-4. Generally each method is described as being implemented via authentication sub-system 150 and particularly the execution of code provided by firmware 255 within authentication device 240. It is however appreciated that certain aspects of the described methods may be implemented via other processing devices and/or execution of other code.

Method 500 illustrates a process for generating a fingerprint template for a user and initiating a power on authentication (POA) state for IHS 100. Method 500 begins at the start block and proceeds to block 502 where processor 105, executing power on authentication firmware 220 under O/S 116, enrolls a user in a power on authentication function. Also at block 502, authentication device 240 enables operation of fingerprint reader 280. The POA function enables fingerprint-based secure access to a user-authenticated operational state of IHS 100.

Processor 105 prompts the user for placement of a finger to be scanned. Prompting the user for placement of a finger includes processor 105 generating and displaying an associated message using one of output devices 134 such as a video screen. Authentication device 240 triggers fingerprint sensor 430 to scan a fingerprint from the finger placed across the fingerprint sensor (block 504). Also, at block 504, authentication device 240 generates a fingerprint image from the finger scan and generates a fingerprint template 320 corresponding to the fingerprint image. Authentication device 240 stores the fingerprint template 320 in secure storage 250 (block 506).

At decision block 508, authentication device 240 determines if the power on authentication function has been enabled. In response to the power on authentication function not being enabled, method 500 ends. In response to the power on authentication function being enabled, authentication device 240 triggers embedded controller 210 to configure BIOS/UEFI 114 for POA operation and enables operation of fingerprint reader 280 (block 510).

Specifically, embedded controller 210 is pre-configured/pre-programmed to interact with BIOS/UEFI 114 during system initialization to: (1) load the power on authentication firmware 220 to run on O/S 116, (2) cause IHS 100 to enter a low power, non-operational state and (3) provide power to fingerprint reader module 280. Authentication device 240 triggers embedded controller 210 to configure BIOS/UEFI 114 for entry into a low power, non-operational state and subsequent activation of a system boot-up/wake-up cycle for IHS 100. Authentication device 240 enables operation of fingerprint reader module 280 by sending a POA enable signal from terminal 246 to fingerprint reader module terminal 286 via isolation circuit 260.

Processor 105 powers down the components of IHS 100 and provides power to fingerprint reader 280 (block 512). Processor 105 can selectively trigger embedded controller 210 to turn fingerprint module 280 on or off. Embedded controller 210, via terminal 212, generates an EC POA enable signal that causes latch circuit 270 turn FET 290 on, which powers fingerprint reader 280. Processor 105 triggers the remaining components and circuits of IHS 100 and authentication sub-system 150 to enter a low power, deep sleep or hibernate state in which IHS 100 and authentication sub-system 150 are not functional. At block 514, controller 420 disconnects the USB communication connection between authentication device 240 (terminal 242) and fingerprint reader 280 (terminal 282) in order to prevent back drive of authentication device 240 in the powered down state. As utilized herein, "back drive" refers to the powering of authentication device 240 from fingerprint reader 280. Method 500 then terminates.

FIG. 6, which is presented as a sequence of three interconnected flow charts numbered 6A-6C, provides a flow chart illustrating an example method to establish fingerprint-based secure access to a user-authenticated operational state of IHS 100. With specific reference to FIG. 6A, method 600 begins at the start block and proceeds to decision block 602 where fingerprint sensor 430 detects if a finger has been placed over the fingerprint sensor and/or if a finger has been swiped across fingerprint sensor 430. The remaining components of IHS 100 are in a low power, non-operating state in which IHS 100 is not functional. Fingerprint sensor 430 continues sensing for the placement of a finger, in response to no detection of placement of a finger across a surface of the fingerprint sensor 430.

In response to detecting placement of a finger across a surface of the fingerprint sensor 430, fingerprint sensor 430 reads or scans a fingerprint from the finger and controller 420 generates a corresponding fingerprint image (block 604). At block 605, controller 420 buffers or stores the fingerprint image to buffer 410 and transmits a POA wake signal to embedded controller 210 via terminals 288 and 218 in order to wake embedded controller 210 from the low power, non-operating state. At block 606, the POA wake signal triggers the embedded controller 210 to start operation of authentication device 240, and authentication device 240 initiates communication with fingerprint reader 280. Embedded controller 210 triggers a SUS ON signal to be generated at terminal 214 that turns on FET 230 and powers authentication device 240.

Authentication device 240 initiates communication with fingerprint reader 280 via establishment of a USB communication interface between terminals 242 and 282.

The authentication device 240 retrieves the stored fingerprint image from buffer 410 (block 608). Authentication device 240 compares the fingerprint image to a previously-established fingerprint template 320 contained in the secure storage 250 (block 610) and determines if the fingerprint image is a match to the fingerprint template (decision block 612). Referring to FIG. 6B, in response to the fingerprint image matching the fingerprint template at block 612, authentication device 240 triggers green LED 450 to flash indicating a passing result (block 614). Authentication device 240 signals the embedded controller 210 via terminal 241 that a successful match has occurred (block 616). The embedded controller 210 then activates a user authenticated wake-up cycle to provide power to the processing and other components of IHS 100 (block 618). The user-authenticated wake-up cycle differs from a regular wake up cycle, since the user has already been authenticated, and the system does not require further entry of user credentials via a credentials login screen (of POA firmware 220). In the presented embodiment, however, during the user authenticated wake-up cycle, authentication device 240 transmits an OS payload 330 to processor 105 to allow BIOS/UEFI 114 to bypass loading of POA firmware 220 after a successful fingerprint match has occurred (block 620). This is because, since the user has already authenticated their identity, there is no need to go through the authentication process a second time during the user authenticated wake-up cycle. In one optional and alternate embodiment, illustrated by dashed block 622, an authentication key (in lieu of and which can be correlated within the figures to the OS payload 330) can be released to the BIOS 114 (block 620). Regardless of how BIOS is initially triggered, BIOS 114 launches the OS from the specific pre-boot environment, e.g., a UEFI or Linux environment (block 622). According to the illustrated embodiment, the receipt of the OS payload 330 triggers processor 105 to bypass loading of POA firmware 220. Processor 105 causes BIOS/UEFI 114 to load operating system 116 such that the information handling system 100 enters a fully powered-on and user authenticated, operational state (block 624). The OS payload 330 is thus released to a launched OS (block 626). Method 600 then ends.

With the above described embodiment, the primary method for triggering the embedded controller to activate the user authenticated wake-up cycle includes: triggering a basic input output system to load a power on authentication application and launch the operating system in response to the embedded controller activating a user authenticated wake-up cycle rather than a regular wake up cycle. The method further includes: transmitting a payload stored in the secure storage from the authentication device to the operating system, where the payload is required for full operation of and accessibility to the operating system; and triggering an operating system environment to be fully accessible on the information handling system in response to receipt of the payload.

Referring to FIG. 6C, in response to the fingerprint image not matching the fingerprint template at block 612, authentication device 240 triggers red LED 460 to flash indicating a failing result (block 630). Authentication device 240 signals the embedded controller 210 that an unsuccessful match or match failure has occurred via terminal 241 (block 632). The embedded controller 210 then returns IHS 100 to a low power, non-operational state in which IHS 100 remains non functional (block 634). The embedded controller 210 provides power to fingerprint reader 280 (block 636). Embedded controller 210 generates an EC POA enable signal via terminal 212 that causes latch circuit 270 to turn on FET 290 which powers fingerprint reader 280.

At block 638, controller 420 disconnects the USB communication connection between authentication device 240 (terminal 242) and fingerprint reader 280 (terminal 282) in order to prevent back drive of authentication device 240 in the powered down state. Method 600 then returns to block 602 where fingerprint sensor 430 continues to detect if a finger has been placed over the fingerprint sensor 430 and/or if a finger has been swiped across fingerprint sensor 430.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method to activate an information handling system having a fingerprint reader, an embedded controller, and a secure storage for enabling fingerprint-based secure access to a user-authenticated operational state of the information handling system, the method comprising:
providing power to the fingerprint reader while remaining components of the information handling system are held in a low power, non-operating state in which the information handling system is not functional;
in response to detecting placement of a finger across a surface of the fingerprint reader while the information handling system is in the low power, non-operating state:
reading a fingerprint from the finger and generating a corresponding fingerprint image;
buffering the fingerprint image;
triggering an embedded controller to start operation of an authentication device having secure storage, wherein triggering the embedded controller to activate the user authenticated wake-up cycle further comprises:
triggering a basic input output system to load a power on authentication application and launch the operating system in response to the embedded controller activating a user authenticated wake-up cycle rather than a regular wake up cycle;
transmitting a payload stored in the secure storage from the authentication device to the operating system, wherein the payload is required for full operation of and accessibility to the operating system; and
triggering an operating system environment to be fully accessible on the information handling system in response to receipt of the payload;
comparing the fingerprint image to a previously-established fingerprint template contained in the secure storage; and
in response to the fingerprint image matching the fingerprint template, the authentication device signaling the embedded controller to activate a user authenticated wake-up cycle to provide power to processing and other components of the information handling system such that the information handling system activates an operating system and enters a fully powered-on and user authenticated, operational state.

2. The method of claim 1, further comprising:
in response to the fingerprint image matching the fingerprint template, the authentication device establishing a universal serial bus communication channel to the fingerprint reader.

3. The method of claim 1, further comprising:
in response to a successful match of the fingerprint image to the fingerprint template, illuminating a light emitting diode to indicate the successful match.

4. The method of claim 1, further comprising:
in response to the fingerprint image not matching the fingerprint template, triggering the embedded controller to return the computer system to the low power, non-operating state that provides power only to the fingerprint reader; and
discontinuing communication between the fingerprint reader and the authentication device.

5. The method of claim 4, further comprising:
illuminating a light emitting diode to indicate an unsuccessful match of the fingerprint image to the fingerprint template.

6. The method of claim 1, further comprising:
while the system is in the operational state, enabling creation of a fingerprint template for use as an authentication mechanism by:
prompting for placement of a finger scan across the fingerprint reader;
scanning a fingerprint from the finger placed across the fingerprint reader;
generating a fingerprint image from the fingerprint;
generating a fingerprint template corresponding to the fingerprint image using the authentication device; and
storing the fingerprint template to the secure storage.

7. The method of claim 1, wherein detecting placement of the finger across the surface of the fingerprint reader further comprises sensing a swipe of the finger across the fingerprint reader.

8. The method of claim 1, wherein the low power, non-operating state is a hibernation state in which the embedded controller, the authentication device, the processors and the remaining components, other than the fingerprint reader, of the information handling system are not functional.

9. A computer implemented method to activate an information handling system having a fingerprint reader, an embedded controller, and a secure storage for enabling fingerprint-based secure access to a user-authenticated operational state of the information handling system, the method comprising:
providing power to the fingerprint reader while remaining components of the information handling system are held in a low power, non-operating state in which the information handling system is not functional;
in response to detecting placement of a finger across a surface of the fingerprint reader while the information handling system is in the low power, non-operating state:
reading a fingerprint from the finger and generating a corresponding fingerprint image;
buffering the fingerprint image;
triggering an embedded controller to start operation of an authentication device having secure storage;
comparing the fingerprint image to a previously-established fingerprint template contained in the secure storage; and
in response to the fingerprint image matching the fingerprint template, the authentication device signaling the embedded controller to activate a user authenticated wake-up cycle to provide power to processing and other components of the information handling system such that the information handling system activates an operating system and enters a fully powered-on and user authenticated, operational state;
wherein activating the user authenticated wake-up cycle further comprises:
in response to the fingerprint image matching the fingerprint template, the secure storage signaling the embedded controller to activate and to by-pass a power on authentication application;
triggering a basic input output system to load;
detecting bypassing of the power on authentication application; and
transmitting a key stored in the secure storage from the authentication device to the basic input output system, wherein the key is required for continued booting of the information handling system without requiring further user authentication.

10. An information handling system (IHS) comprising:
a processor;
a memory coupled to the processor via a system interconnect;
an authentication sub-system communicatively coupled to the system interconnect, the authentication sub-system including a fingerprint reader, an embedded controller, and a secure storage, the authentication sub-system having firmware executing thereon to enable fingerprint-based secure access to a user-authenticated operational state of the information handling system, wherein the firmware configures the authentication sub-system to:
provide power to the fingerprint reader while remaining components of the information handling system are held in a low power, non-operating state in which the information handling system is not functional;
in response to detecting placement of a finger across a surface of the fingerprint reader while the information handling system is in the low power, non-operating state:
read a fingerprint from the finger and generating a corresponding fingerprint image;
buffer the fingerprint image;
trigger an embedded controller to start operation of an authentication device having a secure storage, wherein triggering the embedded controller to activate the user authenticated wake-up cycle comprises the firmware further configuring the authentication sub-system to:
trigger a basic input output system to load a power on authentication application and launch the operating system in response to the embedded discontinue communication between the fingerprint reader and the authentication device.

11. The information handling system of claim 10, wherein the firmware further configures the authentication sub-system to:
in response to the fingerprint image matching the fingerprint template, the authentication device establishing a universal serial bus communication channel to the fingerprint reader.

12. The information handling system of claim 10, wherein the firmware further configures the authentication sub-system to:
in response to a successful match of the fingerprint image to the fingerprint template, illuminate a light emitting diode to indicate the successful match.

13. The information handling system of claim 10, wherein the firmware further configures the authentication sub-system to:
in response to the fingerprint image not matching the fingerprint template, trigger the embedded controller to return the computer system to the low power, non-operating state that provides power to only the fingerprint reader; and
read a fingerprint from the finger and generating a corresponding fingerprint image;
buffer the fingerprint image;
trigger an embedded controller to start operation of an authentication device having a secure storage;
compare the fingerprint image to a previously-established fingerprint template contained in the secure storage; and
in response to the fingerprint image matching the fingerprint template, the authentication device signaling the embedded controller to activate a user authenticated wake-up cycle to provide power to processing and other components of the information handling system such that the information handling system activates an operating system and enters a fully powered-on and user authenticated, operational state
wherein activating the user authenticated wake-up cycle comprises the firmware further configuring the authentication sub-system to:
in response to the fingerprint image matching the fingerprint template, the secure storage signals the embedded controller to activate and to by-pass a power on authentication application;
trigger a basic input output system to load;
detect bypassing of the power on authentication application; and
transmit a key stored in the secure storage from the authentication device to the basic input output system, wherein the key is required for continued booting of the information handling system without requiring further user authentication.

14. The information handling system of claim 13, wherein the firmware further configures the authentication sub-system to:
illuminate a light emitting diode to indicate an unsuccessful match of the fingerprint image to the fingerprint template.

15. The information handling system of claim 10, wherein the firmware further configures the authentication sub-system to:
while the system is in the operational state, enable creation of a fingerprint template for use as an authentication mechanism by:
prompting for placement of a finger scan across the fingerprint reader;
scanning a fingerprint from the finger placed across the fingerprint reader;
generating a fingerprint image from the fingerprint;
generating a fingerprint template corresponding to the fingerprint image using the authentication device; and
storing the fingerprint template to the secure storage.

16. The information handling system of claim 10, wherein the fingerprint reader is positioned on an external surface of the information handling system.

17. The information handling system of claim 10, wherein detecting placement of the finger across the surface of the fingerprint reader further comprises sensing a swipe of the finger across the fingerprint reader.

18. The information handling system of claim 10, wherein the low power, non-operating state is a hibernation state in which the embedded controller, the authentication device, the processors and the remaining components, other than the fingerprint reader, of the information handling system are not functional.

19. An information handling system (IHS) comprising:
a processor;
a memory coupled to the processor via a system interconnect;
an authentication sub-system communicatively coupled to the system interconnect, the authentication sub-system including a fingerprint reader, an embedded controller, and a secure storage, the authentication sub-system having firmware executing thereon to enable fingerprint-based secure access to a user-authenticated operational state of the information handling system, wherein the firmware configures the authentication sub-system to:

provide power to the fingerprint reader while remaining components of the information handling system are held in a low power, non-operating state in which the information handling system is not functional;

in response to detecting placement of a finger across a surface of the fingerprint reader while the information handling system is in the low power, non-operating state:

controller activating a user authenticated wake-up cycle rather than a regular wake up cycle;

transmit a payload stored in the secure storage from the authentication device to the operating system, wherein the payload is required for full operation of and accessibility to the operating system; and trigger an operating system environment to be fully accessible on the information handling system in response to receipt of the payload;

compare the fingerprint image to a previously-established fingerprint template contained in the secure storage; and in response to the fingerprint image matching the fingerprint template, the authentication device signaling the embedded controller to activate a user authenticated wake-up cycle to provide power to processing and other components of the information handling system such that the information handling system activates an operating system and enters a fully powered-on and user authenticated, operational state.

* * * * *